United States Patent
Kim

[19]

[11] Patent Number: 6,111,661
[45] Date of Patent: *Aug. 29, 2000

[54] AUTOMATIC TTI TRANSMISSION CONTROL METHOD AND APPARATUS

[75] Inventor: Young-Hoon Kim, Seoul, Rep. of Korea

[73] Assignee: SamSung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/883,144

[22] Filed: Jun. 26, 1997

[30] Foreign Application Priority Data

Jun. 26, 1996 [KR] Rep. of Korea ............. 96-24073

[51] Int. Cl.[7] .................... H04N 1/00; H04M 11/00
[52] U.S. Cl. ............. 358/434; 358/440; 379/100.01
[58] Field of Search .................. 358/400, 434, 358/435, 436, 440, 438, 439, 442, 402, 405, 406; 379/100.01, 100.06, 100.08, 100.13, 100.14, 102.07, 106.08, 108.02

[56] References Cited

U.S. PATENT DOCUMENTS

| | | |
|---|---|---|
| 4,996,707 | 2/1991 | O'Malley et al. ............. 379/100 |
| 5,021,889 | 6/1991 | Yamamoto ............. 358/440 |
| 5,041,918 | 8/1991 | Ishida et al. ............. 358/442 |
| 5,072,307 | 12/1991 | Shirakoshi et al. ............. 358/400 |
| 5,077,804 | 12/1991 | Richard ............. 382/7 |
| 5,175,684 | 12/1992 | Chong ............. 364/419 |
| 5,287,199 | 2/1994 | Zoccolillo ............. 358/402 |
| 5,305,372 | 4/1994 | Tomiyori ............. 379/59 |
| 5,333,180 | 7/1994 | Brown et al. ............. 379/89 |
| 5,384,831 | 1/1995 | Creswell et al. ............. 379/67 |
| 5,461,488 | 10/1995 | Witek ............. 358/402 |
| 5,701,497 | 12/1997 | Yamauchi et al. ............. 395/753 |

*Primary Examiner*—Madeleine Nguyen
*Attorney, Agent, or Firm*—Robert E. Bushnell, Esq.

[57] ABSTRACT

A method includes automatically transmitting a transmit terminal identification which is formatted in the reception country's language when transmitting a document internationally from a facsimile system having memory storing transmit terminal identifications formatted in different languages. This can involve the steps of receiving the facsimile transmission number entered by a user, and comparing the first three digits of the number entered to the relevant international telephone service numbers, to determine if the transmission is domestic or international. When making an international transmission, the digits following the first three digits are compared to a table of country codes to determine the receiving country. Then a transmit terminal identification, formatted in the language of the receiving country, is read and transmitted.

17 Claims, 2 Drawing Sheets

AUTOMATIC TTI TRANSMISSION CONTROL METHOD AND APPARATUS

CLAIM OF PRIORITY

This application makes reference to, incorporates the same herein, and claims all benefits accruing under 35 U.S.C. §119 from an application entitled AUTOMATIC TTI TRANSMISSION CONTROL METHOD earlier filed in the Korean Industrial Property Office on Jun. 26, 1996, and there duly assigned Ser. No. 96-24073 by that Office.

BACKGROUND OF THE INVENTION

1. Field of the Invention

The present invention relates to a method and apparatus for transmitting a transmit terminal identification (TTI) with a facsimile system. More specifically, the present invention relates to a method and apparatus for automatically transmitting the TTI in the language of the receiver country during calls, which can be domestic or international calls.

2. Description of the Related Art

Frequently, facsimile systems store their number, company name or user name, address, transmission time, and so on in a storage device using a particular format. These formats can differ among the facsimile systems. Even in situations that the contents and formats differ between systems, this information is transmitted to the other facsimile systems in advance of transmitting a document. This format is called a TTI (or, a transmit terminal identification) format.

Usually, a TTI is formatted in only one language, for example, English, German, Japanese, Korean, etc. In many contemporary facsimile systems, the TTI is formatted in only one language without regard to the language of the receiving party. Such formatting in only one language is utilized even when transmitting internationally. If transmission and reception facsimiles utilize the same language to format their TTI's, this is no problem. However, if they utilize different languages, the reception party cannot read the TTI. Among the contemporary practice and art, Yamamoto (U.S. Pat. No. 5,021,889, *Facsimile Apparatus*, Jun. 4, 1991) discusses some language identification according to the country codes. However, the invention Yamamoto is quite different in that a separate parameter memory is provided for storing various information. This is particularly clear as one looks at FIG. 1 of Yamamoto together with the words that describe the parameter memory 2 at column 2, lines 15–24 of Yamamoto. Further, the country code is stored at controller 1 of Yamamoto. Column 3, lines 1–6 clearly states that "the controller 1 stores the inputted country code." As will be clear from the descriptions that follow, the present invention is simply not an invention in the type of Yamamoto. Among other exemplars of the contemporary practice, Zocollillo (U.S. Pat. No. 5,287,199, *Facsimile Message Processing And Routing System*, Feb. 15, 1994) discusses a processor connected to a communication switching system that converts the message to a different format, if necessary. Witek (U.S. Pat. No. 5,461,488, *Computerized Facsimile (FAX) System And Method of Operation*, Oct. 24, 1995) discusses converting non-text format of the file to a text format which is read by a pattern recognition program. Creswell et al. (U.S. Pat. No. 5,384,831, *System For Providing Personalized Telephone Calling Features*, Jan. 24, 1995) discusses having a different call treatment for each such identifier as well as a particular billing mode. Richard (U.S. Pat. No. 5,077,804, *Telecommunications Device And Related Method*, Dec. 31, 1991) discusses a facsimile telecommunications system including a method for at least partially automatically converting monetary amounts in a document from one currency to a second currency. Shirakoshi et al. (U.S. Pat. No. 5,072,307, *Facsimile Device*, Dec. 10, 1991) discusses a facsimile device that has a reader unit receiving and reading the light reflected from the original document. Ishida et al. (U.S. Pat. No. 5,041,918, *Facsimile Adaper Unit*, Aug. 20, 1991) discusses an apparatus that can send facsimile data upon using a bit map conversion unit for converting to a format that is appropriate for sending by a facsimile transmission. O'Malley et al. (U.S. Pat. No. 4,996,707, *Text-To-Speech Converter Of A Facsimile Graphic Image*, Feb, 26, 1991) discusses a software that can convert graphic images of textual material. From my study of the contemporary practice and art, I find that there is a need for an effective and improved method and apparatus for automatically transmitting the TTI in the language of the receiver country during calls, especially with such effective memory handling as in the present invention.

SUMMARY OF THE INVENTION

Thus, an object of the present invention is to provide an improved method and apparatus for transmitting a transmit terminal identification (TTI) with a facsimile system.

Another object of the present invention is to provide an improved method and apparatus for automatically transmitting the TTI in the language of the receiver country during calls, which can be domestic or international calls.

Another object of the present invention is to provide a method for automatically selecting a TTI format, using the reception party's language, from a collection of TTIs formatted in different languages when transmitting internationally, with an effective memory handling.

To achieve these and other objects of the present invention, there is provided a method for automatically transmitting a transmit terminal identification. This is formatted in the receiving country's language when transmitting a document internationally from a facsimile system having memory storing transmit terminal identifications formatted in different languages. The method includes the steps of: receiving the facsimile transmission number entered by a user, and comparing the first three digits of the number to the relevant international telephone service access numbers. The method can include other steps of determining if the transmission is domestic or international, and comparing the digits, following the first three digits of the number, to a list of country codes to determine the reception country, when transmitting internationally. This is read and transmitted; the transmit terminal identification formatted in the language of the reception country is read and transmitted.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT(S)

With reference to the attached drawings, the present invention is described below in detail.

Figure 1:
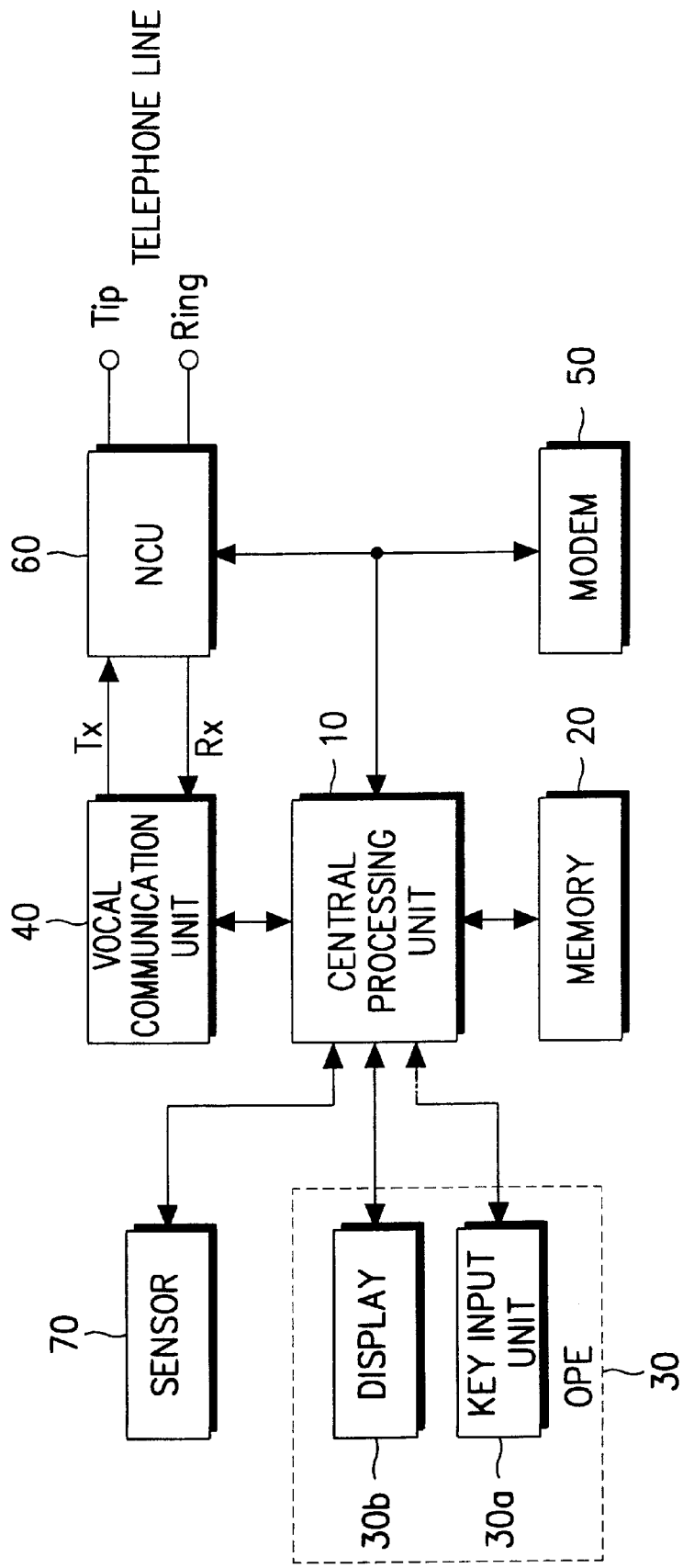
FIG. 1 is a block diagram of a facsimile system built in accordance with the principles of the present invention.

Turning now to the drawings, FIG. 1 shows the parts of the facsimile system, as they work together. As shown in FIG. 1, central processing unit (CPU) 10 is used for the overall control of the facsimile system. Memory 20, under the control of CPU 10, stores a program of the present invention and data generated while operating this program of the present invention. In particular, memory 20 stores TTI formatted in different languages, the relevant international telephone service access numbers, country codes (example: Japan—81) and area/city codes (example: Seoul—02). Operating panel 30 consists of key entry unit 30a and display 30b. Key entry unit 30a has various keys, including a dial key, to transmit commands from the user to CPU 10. Display 30b, which is a liquid crystal display (LCD), displays messages under the control of CPU 10. Under the control of CPU 10, sensor 70 checks for documents to be transmitted and senses any remaining sheets of paper, then transmits the results to CPU 10. Modem 50, under the control of CPU 10, converts the data to be transmitted into analog signals which it forwards to network control unit (NCU) 60. Similarly and analogously, modem 50 converts any received analog data into digital signals, when it then transmits to CPU 10. NCU 60, under the control of CPU 10, forms a telephone network and communications loop using telephone lines, Tip and Ring, and the interface between modem 50 and telephone lines. Vocal communication unit 40 includes a handset (not shown in the drawings) connected to the receiving party through NCU 60, so as to enable the user to communicate using the handset under the control of CPU 10.

Figure 2:
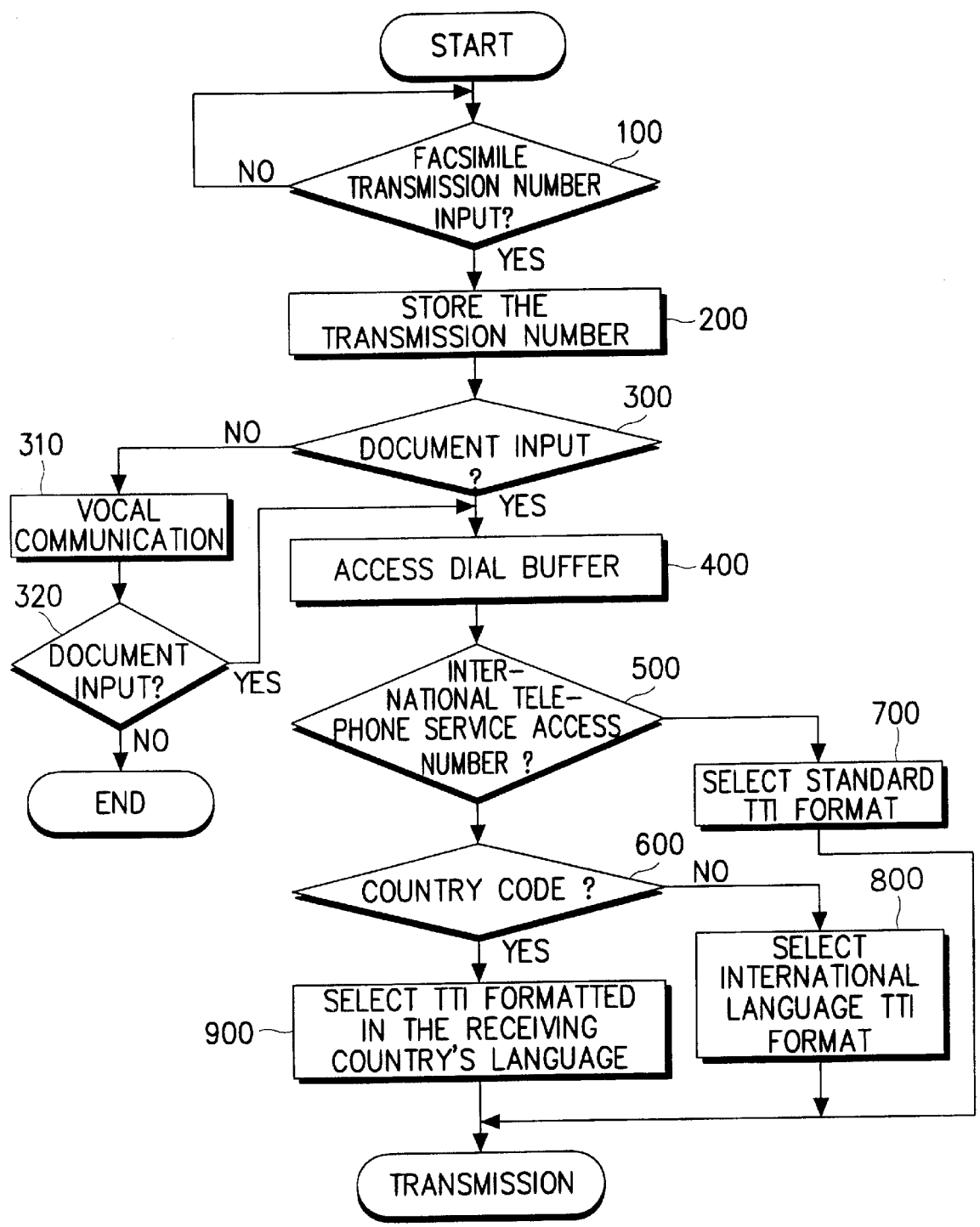
FIG. 2 is a flow chart illustrating an automatic TTI transmission control procedure, in accordance with the present invention.

The automatic TTI transmission control procedure according to the present invention can be as follows. The following describes the procedure in detail with reference to FIGS. 1 and 2. During the process of transmitting a document, a user of a facsimile system enters the receiving party's facsimile transmission number through key input unit or key entry unit 30a. When the user enters the facsimile transmission number, CPU 10 receives the number (step 100) and stores it in memory 20 (step 200). Then, CPU 10 instructs sensor 70 to check if a document is input, then checks (or "examines") whether a signal indicating a document input is transmitted from sensor 70 (step 300). When no document is sensed at step 300, CPU 10 controls vocal communication unit 40 and NCU 60 so as to form a communications loop for vocal communication (step 310). When the communication is complete, CPU 10 uses sensor 70 to detect if a document is ready by detecting the document sensed signal is transmitted from sensor 70 (step 320). When the document sensed signal is not detected at step 320, CPU 10 finishes this process. Thus, the system makes sure that the system is ready for a facsimile transmission.

When CPU 10 detects the document sensed signal from sensor 70, (step 300) CPU 10 reads the facsimile transmission number entered by the user from memory (dial buffer) 20 (step 400). This memory 20 is, of course, used for purposes other than being a dial buffer. CPU 10 compares the first three digits of the number read from memory 20 to the list of international telephone service access numbers, previously stored in memory 20. This is done in order to determine if the transmission is domestic or international (step 500). When the transmission is deemed domestic, CPU 10 reads the standard TTI, which is formatted in the local language, and transmits it (step 700). When the transmission is deemed international, CPU 10 compares the next one or two digits, following the first three digits, to a table of country codes, previously stored in memory 20, so as to determine a country where the document is being transmitted (step 600). For example, if the next digits are "81", CPU 10 determines that Japan is the reception country. CPU 10 then checks if there is a TTI formatted in the language of the determined country (for example, Japanese) among the TTIs stored in memory 20 (step 900). When CPU 10 cannot find a corresponding TTI, it transmits a TTI formatted in an international language, such as English (step 800). When CPU 10 finds a corresponding TTI in memory, CPU 10 reads and transmits the corresponding TTI. Thus, the facsimile transmission occurs.

In the preferred embodiment described previously, a facsimile system is directly connected to an office line. When a facsimile system is connected through a key phone system or private exchange, the first digit of a number entered by the user, for example 9, indicates the number for accessing an office line. In such a case, the comparison is performed starting from the second digit.

There can, of course, be other preferred embodiments. In another preferred embodiment of the present invention, CPU 10 receives the transmission number entered by a user using key entry unit 30a. Then, CPU 10 performs an automatic TTI transmission using the procedure shown in FIG. 2—omitting the step of sensing the input of a document.

As described in the previous paragraphs, the present invention determines the reception country using the transmission number entered by the user. Then the apparatus of the present invention transmits a TTI formatted in the corresponding country's language, so as to permit the receiving party to read the TTI that has been transmitted to the receiving party.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for transmitting from a facsimile system, comprising:

a dial buffer memory for storing a facsimile transmission number entered by a user and for storing a plurality of transmit terminal identifications for a transmitting facsimile system formatted in different languages;

means for receiving the facsimile transmission number entered by the user;

means for determining whether a current facsimile transmission is one of a domestic facsimile transmission and an international facsimile transmission by comparing a first three digits of the facsimile transmission number entered by the user with a corresponding international telephone service number;

means for comparing digits following the first three digits of the facsimile transmission number with country codes to determine a receiving country, when the current facsimile transmission is an international facsimile transmission; and means for selectively reading and transmitting one of said transmit terminal identifications for said transmitting facsimile system stored in the dial buffer memory on a basis of the facsimile transmission number, said means for selectively reading and transmitting selectively reading and transmitting a transmit terminal identification for said transmitting facsimile system formatted in a language of the receiving country, if one of said transmit terminal identifications for said transmitting facsimile system is formatted in the language of the receiving country.

2. The apparatus as claimed in claim 1, further comprising:

means for alternatively reading and transmitting a transmit terminal identification for said transmitting facsimile system formatted in a language of a transmitting country.

3. The apparatus as claimed in claim 1, further comprising:

means for alternatively reading and transmitting a transmit terminal identification for said transmitting facsimile system formatted in a predetermined language when the dial buffer memory contains no transmit terminal identification for said transmitting facsimile system formatted in the language of the receiving country.

4. The apparatus as claimed in claim 1, further comprising:

means for alternatively reading and transmitting a transmit terminal identification for said transmitting facsimile system formatted in English language when the dial buffer memory contains no transmit terminal identification for said transmitting facsimile system formatted in the language of the receiving country.

5. The apparatus as claimed in claim 1, further comprising:

means for alternatively reading and transmitting a transmit terminal identification for said transmitting facsimile system formatted in a language selected by the user when the dial buffer memory contains no transmit terminal identification for said transmitting facsimile system formatted in the language of the receiving country.

6. The apparatus as claimed in claim 2, further comprising:

means for alternatively reading and transmitting a transmit terminal identification for said transmitting facsimile system formatted in a predetermined language when the dial buffer memory contains no transmit terminal identification for said transmitting facsimile system formatted in the language of the receiving country.

7. The apparatus as claimed in claim 2, further comprising:

means for alternatively reading and transmitting a transmit terminal identification for said transmitting facsimile system formatted in English language when the dial buffer memory contains no transmit terminal identification for said transmitting facsimile system formatted in the language of the receiving country.

8. The apparatus as claimed in claim 2, further comprising:

means for alternatively reading and transmitting a transmit terminal identification for said transmitting facsimile system formatted in a language selected by the user when the dial buffer memory contains no transmit terminal identification for said transmitting facsimile system formatted in the language of the receiving country.

9. A method for transmitting from a facsimile system, comprising the steps of:

providing a dial buffer memory for storing a facsimile transmission number entered by a user and for storing a plurality of transmit terminal identifications for a transmitting facsimile system formatted in different languages;

receiving the facsimile transmission number entered by the user;

determining whether a current facsimile transmission is one of a domestic facsimile transmission and an international facsimile transmission by comparing a first three digits of the facsimile transmission number entered by the user with a corresponding international telephone service number;

when the current facsimile transmission is an international facsimile transmission, comparing digits following the first three digits of the facsimile transmission number with country codes to determine a receiving country; and selectively reading and transmitting one of said transmit terminal identifications for said transmitting facsimile system stored in the dial buffer memory on a basis of the facsimile transmission number, wherein selectively read and transmitted is a transmit terminal identification for said transmitting facsimile system formatted in a language of the receiving country, if one of said transmit terminal identifications for said transmitting facsimile system is formatted in the language of the receiving country.

10. The method as claimed in claim 9, further comprising the step of alternatively reading and transmitting a transmit terminal identification for said transmitting facsimile system formatted in a language of a transmitting country.

11. The method as claimed in claim 9, further comprising the step of alternatively reading and transmitting a transmit terminal identification for said transmitting facsimile system formatted in a predetermined language when the dial buffer memory contains no transmit terminal identification for said transmitting facsimile system formatted in the language of the receiving country.

12. The method as claimed in claim 9, further comprising the step of alternatively reading and transmitting a transmit terminal identification for said transmitting facsimile system formatted in English language when the dial buffer memory contains no transmit terminal identification for said transmitting facsimile system formatted in the language of the receiving country.

13. The method as claimed in claim 9, further comprising the step of alternatively reading and transmitting a transmit terminal identification for said transmitting facsimile system formatted in a language selected by the user when the dial buffer memory contains no transmit terminal identification for said transmitting facsimile system formatted in the language of the receiving country.

14. The method as claimed in claim 10, further comprising the step of alternatively reading and transmitting a transmit terminal identification for said transmitting facsimile system formatted in a predetermined language when the dial buffer memory contains no transmit terminal identification for said transmitting facsimile system formatted in the language of the receiving country.

15. The method as claimed in claim 10, further comprising the step of alternatively reading and transmitting a transmit terminal identification for said transmitting facsimile system formatted in English language when the dial buffer memory contains no transmit terminal identification for said transmitting facsimile system formatted in the language of the receiving country.

16. The method as claimed in claim 10, further comprising the step of alternatively reading and transmitting a transmit terminal identification for said transmitting facsimile system formatted in a language selected by the user when the dial buffer memory contains no transmit terminal identification for said transmitting facsimile system formatted in the language of the receiving country.

17. An apparatus for transmitting from a facsimile system, comprising:

- a dial buffer memory for storing a facsimile transmission number entered by a user and for storing a plurality of transmit terminal identifications for a transmitting facsimile system formatted in different languages;
- an operating panel for receiving the facsimile transmission number entered by the user;
- a central processing unit for determining whether a current facsimile transmission is one of a domestic facsimile transmission and an international facsimile transmission by comparing a first three digits of the facsimile transmission number entered by the user with a corresponding international telephone service number, said central processing unit for comparing digits following the first three digits of the facsimile transmission number with country codes to determine a receiving country when the current facsimile transmission is an international facsimile transmission;
- a modem for selectively transmitting one of said transmit terminal identifications for said transmitting facsimile system stored in the dial buffer memory on a basis of the facsimile transmission number, said one of said transmit terminal identifications for said transmitting facsimile system formatted in a language of at least one of the receiving country, a transmitting country, a user selected country and a predetermined country; and
- a network control unit for transmitting said one of said transmit terminal identifications for said transmitting facsimile system.

* * * * *